United States Patent
Andrews

[19]

[11] Patent Number: 5,816,233
[45] Date of Patent: Oct. 6, 1998

[54] ARCHERY BOW LIMB AND METHOD

[75] Inventor: Albert A. Andrews, Chattanooga, Tenn.

[73] Assignee: High Country Archery, Inc., Dunlap, Tenn.

[21] Appl. No.: 754,973

[22] Filed: Nov. 22, 1996

[51] Int. Cl.⁶ .............................. F41B 5/00; B32B 31/26
[52] U.S. Cl. .............................. 124/86; 124/23.1; 156/85
[58] Field of Search .............................. 124/23.1, 86, 88; 156/84, 85, 309.6; 264/230, 261, 342 R

[56] References Cited

U.S. PATENT DOCUMENTS

| | | | |
|---|---|---|---|
| 2,483,145 | 9/1949 | Menne | 124/23.1 |
| 2,613,660 | 10/1952 | Bear | 124/23.1 |
| 2,815,015 | 12/1957 | DeGiacomo | 124/23.1 |
| 2,876,067 | 3/1959 | Nagel et al. | 156/85 X |
| 3,533,864 | 10/1970 | Ianuzzi et al. | 156/85 X |
| 3,674,581 | 7/1972 | Kalnin et al. | 156/85 X |
| 4,109,912 | 8/1978 | Zentmyer | 156/85 X |
| 4,153,747 | 5/1979 | Young et al. | 156/85 X |
| 4,428,789 | 1/1984 | Masaaki et al. | 156/85 |
| 4,836,872 | 6/1989 | Landry et al. | 156/85 |
| 5,009,730 | 4/1991 | Tozier | 156/85 |

Primary Examiner—John A. Ricci
Attorney, Agent, or Firm—Barnes, Kisselle, Raisch, Choate, Whittemore & Hulbert, P.C.

[57] ABSTRACT

A composite reinforced limb of an archery bow is at least partially encased in a flexible plastic material which closely overlies and firmly engages the limb to substantially prevent the composite layers or fibers adjacent the limb from becoming detached from the limb. The plastic material is preferably in the form of a tube which contracts when heated and conforms to the shape of and firmly engages the limb. Encasing the limbs also reduces vibration of the limb and noise of the bow during use and thus, enhances the performance of the bow. Further, the tube encasing the limb tends to confine any pieces of the limb which may tend to injure an archer if the limb cracks, splinters or otherwise breaks in use.

15 Claims, 1 Drawing Sheet

ARCHERY BOW LIMB AND METHOD

FIELD OF THE INVENTION

This invention relates to archery bows and more particularly to a limb of an archery bow and a method of making it.

BACKGROUND OF THE INVENTION

Archery bows have resilient limbs made of various materials such as wood, various metals and various composite materials. Additionally, composite materials such as fiberglass or the like can also be layered about the limb to provide reinforcement and stability to the limb. Typically, the composite reinforcements are applied to the limb in thin layers adhered by a resin to the surface of the limb. It is difficult to consistently and permanently adhere all of the composite material to the limb and, during use, some of the fibers or a portion of the underlying layers of the composite material become detached from the limb of the bow and create a cosmetic blemish noticeable on the exterior of the limb and unacceptable to the user.

SUMMARY OF THE INVENTION

A composite reinforced limb of an archery bow is at least partially encased in a flexible plastic material which closely overlies and firmly engages the limb to prevent the underlying composite layers or fibers adjacent the limb from becoming noticeably detached from the limb, to reinforce the limb and to reduce vibration and noise of the bow during use. Preferably, a tube made of a heat shrinkable material is disposed adjacent the exterior of at least a portion of the limb and upon heating of the tube, it contracts to conform to the shape of and firmly engage the body of the limb. Preferably, the interior of the tube is lined with resin or a meltable liner which softens or melts when heated and firmly adheres the tube to the limb and also helps to hold down the fibers of the composite material reinforcing the limb. The firm engagement of the shrinkable tubing to the limb of the bow substantially eliminates the problem of inconsistent or incomplete attachment of the fibers of the composite reinforcements to the body of the limb. In addition, the resilient material of the shrinkable tubing dampens the vibrations which occur within the limb during use of the bow. Further, the shrinkable tubing provides a factor of safety when the bow fails during use, such as when the limb of the bow cracks or otherwise breaks, by providing an extra layer of material adjacent to the limb which tends to confine any fibers, splinters or ruptures of the limb material.

Objects, features and advantages of this invention include providing an archery bow having composite reinforced limbs having at least a portion of the limbs encased with at least one layer of a flexible plastic material to reduce the problem of the fibers of the composite reinforcement splintering or becoming detached from the limb, dampens vibrations within the limb, reduces noise of the bow during its use, reduces wear of the bow and its accessories, reduces the magnitude of the vibrations experienced by the user, provides an additional adhesive layer to improve the attachment of composite fibers and the tube adjacent to the limb, provides added safety to the user of the bow when the limb of the bow cracks or otherwise breaks, increases the rate at which an arrow is released from the bow, minimizes wear on the bow, provides additional reinforcement to the limbs, is resistant to scratches and cuts, provides a durable surface to the limbs of the bow, and is of relatively simple design and economical manufacture and has a long in-service useful life.

BRIEF DESCRIPTION OF THE DRAWINGS

These and other objects, features, and advantages of this invention will be apparent from the following detailed description of the preferred embodiment and best mode, appended claims, and accompanying drawings in which:

DETAILED DESCRIPTION OF THE PREFERRED EMBODIMENT

Figure 1:
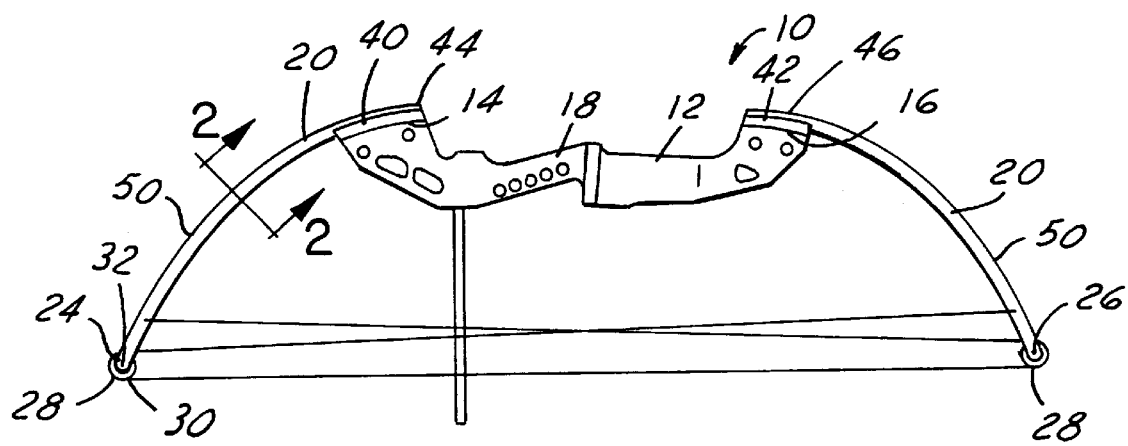
FIG. 1 is a perspective view of a compound bow embodying this invention.

Referring in more detail to the drawings, FIG. 1 shows an archery bow 10 having a riser 12 with opposed ends 14, 16, a handle portion 18 of the riser 12, a limb 20 cantilevered and extending from each end 14, 16 of the riser 12, and a bowstring 22 attached between the free end 24, 26 of each limb 20. This type of bow 10 is typically referred to as a compound bow and preferably has a cam system 28 disposed adjacent the free ends 24, 26 of each limb 20 about an axle 30 received in an axle hole 32 through the limb 20 with the bowstring 22 wound about each cam 28. The cams 28 are preferably complementarily shaped and the bowstring 22 is wound about the cams 28 in such a way that displacement of the bowstring 22 causes substantially equal deflection of each of the limbs 20 thereby storing substantially equal amounts of potential energy within each limb 20 when deflected. Preferably, to facilitate pulling the drawstring 22 and deflecting the limbs 20, the cams 28 have a profile which varies the draw weight of the bow 10 as a function of the draw length. Preferably the maximum draw weight is achieved somewhat before maximum draw and decreases somewhat at full draw length.

The riser 12 of the bow 10 is made of a relatively stiff material, such as various woods, metals and composite materials, and is resistant to bending to provide a stable surface for the archer to hold while using the bow 10. The handle portion 18 is preferably ergonomically designed to fit within the archers hand at a location providing balance while both holding the bow 10 and while pulling the bowstring 22. Each end 14, 16 of the riser 12 has a generally flat face 40, 42 inclined at an acute included angle relative to the longitudinal axis of the riser 12 providing a mounting surface for an end 44, 46 of a limb 20.

The limbs 20 of the bow 10 are made of a highly resilient material and are generally thin and elongate so that they may be relatively easily deflected. The limbs 20 are cantilevered adjacent each end 14, 16 of the riser 12 and are preferably generally arcuate or slightly curved. The limbs 20 can be made from various materials such as wood, metal and composite materials. Preferably, the limbs 20 are reinforced with a composite material 48 adhered to the limbs 20 with a resin. Also preferably, the composite reinforcement 48 comprises thin layers of fiberglass roving or fibers embedded in a resin firmly adhered to the limbs 20.

Figure 2:
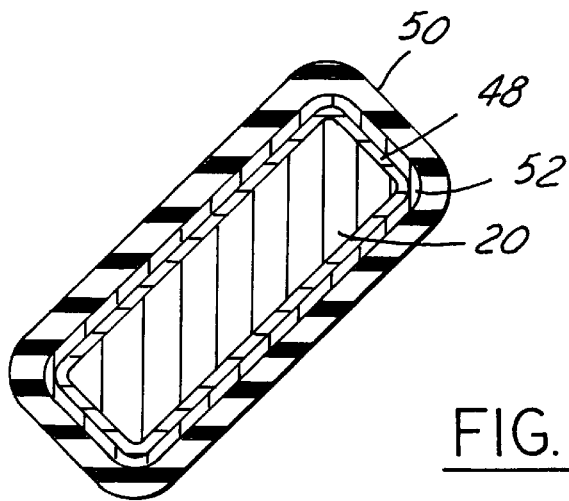
FIG. 2 is a sectional view of a limb of the bow encased with a tube of heat shrinkable material.

According to the present invention, as shown in FIG. 2, the limbs 20 are encased within a tube 50 formed of a heat shrinkable material which has been heated to firmly engage the tube 50 with the limbs 20. To provide an extra layer of adhesive material adjacent to the limb 20 tending to adhere the composite reinforcements 48 and the tube 50 to the limb 20, the tube 50 preferably has an inner adhesive lining 52. The adhesive lining 52 preferably softens when the tube 50 is heated and tends to coat or cover the fibers of the composite reinforcements 48 on the limb 20 and can melt and flow to conform to the shape of the bow 10 and thereby provide mechanical and environmental protection to the bow 10 as well as dampen vibrations of the limb 20. Alternatively, the tube 50 has an inner liner formed of a material which melts when the tube 50 is heated to substantially evenly engage the limb 20, to conform to the shape of the limb 20, to tend to confine the fibers of the composite reinforcements 48 and to hold the tube 50 adjacent the limb 20.

The tube 50 is preferably formed of a flexible plastic material such as a thermoplastic, thermoset or elastomer. Representative plastics used in currently available shrinkable tubing include polyethylene and olefin copolymers, fluoropolymers, chloropolymers, polyamides, polyvinylidene, polyesters, silicones, and various elastomers including silicone elastomers and neoprene elastomers. Typical tubes 50 formed of heat shrinkable material are extruded and outwardly expanded and when heated, they retract or shrink toward their original form to conform to the shape of and firmly engage the object they encase. Preferably, the tubes 50 do not affect the flexibility or resiliency of the limbs 20, or the draw weight or draw length of the bow 10.

A currently preferred tube 50 of heat shrinkable material is formed of a flexible polyolefin and is commercially available from Raychem under the trade name Thermofit® and can be purchased in a size generally having an inside diameter usually in the range of about 0.25 inch to about 1.5 inches, desirably about 0.30 to 1.0 inch and preferably about 0.40 inch to 0.75 inch. The wall thickness of the tube 50 when fully recovered after heating is usually in the range of about 0.020 inch to 0.100 inch and preferably 0.030 inch to 0.060 inch. This material has a representative tensile strength of about 3,000 psi and an elongation of 500%.

One tube 50 is preferably stretched over the free end 24, 26 of each limb 20 and each tube 50 preferably extends substantially the entire length of the limb 20 it encases. Each tube 50 is then heated so that it contracts and conforms to the shape of and firmly engages its adjacent limb 20. Preferably, each tube 50 surrounding a limb 20 is heated in an oven to a temperature of about 300° F. to 350° F. for at least 5 minutes and preferably about 5 to 7 minutes. Preferably, each tube 50 has an inner liner 52 of an adhesive or meltable material which adheres together the tube 50 and the limb 20 as described above.

In use, the tube 50 of heat shrinkable material disposed in firm engagement with the limbs 20 of the bow 10 and the adhesive or meltable liner 52 within the tube 50 helps to prevent the fibers of the composite reinforcements 48 of the limbs 20 from splintering and prevents any splinters from being noticeable. The resilient and pliable qualities of the tube 50 material also reduce vibration of the limb 20 during use which increases the performance of the bow 10 and has the effect of increasing the speed obtained by an arrow shot from the bow 10 by about 1 to 2 feet per second. The reduced vibration also reduces the noise of the bow 10 during use, reduces wear of the bow and reduces the magnitude of the vibrations experienced by the user. In addition, the tube 50 encased limbs 20 provide an added safety factor as the tube 50 material tends to contain within the tube 50 any cracked or broken pieces of the limb 20 thereby reducing the likelihood of injury to the archer. Thus, the encased limbs 20 substantially prevent the fibers of the composite reinforcement 48 of the limbs 20 from splintering or becoming detached from the limbs 20, and also improves the performance and safety of the bow 10 in use.

I claim:

1. A limb for an archery bow comprising:
    an elongate body formed from a resilient composite material having fibers embedded in a resin adhered to the elongate body, and a tube of a heat shrinkable flexible plastic material encasing and heat shrunk into firm engagement with at least a portion of the composite material of the limb.
2. The limb of claim 1 wherein a resin is disposed between the tube and the body which firmly adheres the tube to the body.
3. The limb of claim 2 wherein the resin becomes less viscous upon heating.
4. The limb of claim 1 wherein the tube is of a meltable material and is heated to an elevated temperature to become pliable and conform to the shape of and firmly engage the body.
5. The limb of claim 1 wherein a liner of a material that melts when heated is disposed between the tube and the body and the material is at least partially melted.
6. The limb of claim 1 wherein the tube is formed of an elastomeric material.
7. The limb of claim 1 wherein the tube is formed of a thermoplastic material.
8. A method of making a limb for an archery bow comprising the steps of:
    a) providing an elongate body formed from a resilient material;
    b) adhering at least one layer of a composite material with fibers and a resin to the body;
    c) providing a generally cylindrical tube of a heat shrinkable flexible plastic material encircling at least a major portion of the composite material;
    d) heating to shrink the tube into firm engagement with the composite material.
9. The method of claim 8 wherein a resin is disposed between the tube and the composite material to firmly adhere the tube to the composite material.
10. The method of claim 8 wherein a resin is disposed between the tube and the composite material and the resin becomes less viscous upon heating to firmly adhere the tube to the composite material.
11. The method of claim 8 wherein a liner of a material that melts when heated is disposed between the tube and the composite material and the liner substantially melts when the tube is heated to firmly adhere the tube to the composite material.
12. The method of claim 8 wherein the tube is formed of an elastomeric material.
13. The method of claim 8 wherein the tube is formed of a thermoplastic material.
14. A limb for an archery bow comprising:
    an elongate body of a resilient material including fibers embedded in resin forming at least an exterior surface of the body and a tube of a heat shrinkable flexible plastic material encasing and heat shrunk into firm engagement with at least a major portion of the exterior surface of the body of the limb.
15. The limb of claim 14 wherein the body is formed of a plurality of layers of fibers embedded in resin, each layer joined to at least one adjacent layer.

* * * * *